(12) United States Patent
Auslander et al.

(10) Patent No.: US 7,153,350 B2
(45) Date of Patent: Dec. 26, 2006

(54) WATER SOLUBLE COLORANTS FOR INK JET PRINTING

(75) Inventors: Judith D. Auslander, Westport, CT (US); John Griffiths, Leeds (GB); John Mama, Leeds (GB)

(73) Assignee: Pitney Bowes Inc., Stamford, CT (US)

( * ) Notice: Subject to any disclaimer, the term of this patent is extended or adjusted under 35 U.S.C. 154(b) by 359 days.

(21) Appl. No.: 10/732,735

(22) Filed: Dec. 10, 2003

(65) Prior Publication Data

US 2005/0126432 A1    Jun. 16, 2005

(51) Int. Cl.
*C09D 11/00* (2006.01)

(52) U.S. Cl. ................ 106/31.32; 106/31.15

(58) Field of Classification Search ........... 106/31.32, 106/31.15
See application file for complete search history.

(56) References Cited

U.S. PATENT DOCUMENTS

| | | | | |
|---|---|---|---|---|
| 3,784,599 A * | 1/1974 | Jefferies et al. | ............ | 540/125 |
| 5,034,547 A * | 7/1991 | Smith et al. | ............... | 552/235 |
| 5,135,569 A * | 8/1992 | Mathias | .................. | 106/31.32 |
| 5,674,314 A | 10/1997 | Auslander et al. | ......... | 106/21 A |
| 5,919,846 A | 7/1999 | Batlaw et al. | ................ | 524/83 |
| 5,981,747 A * | 11/1999 | Mujumdar et al. | ......... | 540/555 |
| 6,005,022 A | 12/1999 | Schwarz, Jr. | ............... | 523/160 |
| 6,048,390 A | 4/2000 | Yano et al. | ............... | 106/31.43 |
| 6,224,660 B1 | 5/2001 | Stubbe et al. | ............ | 106/31.13 |
| 6,284,027 B1 | 9/2001 | Auslander et al. | ....... | 106/31.15 |
| 6,391,103 B1 | 5/2002 | Auslander et al. | ....... | 106/31.27 |
| 6,559,306 B1 | 5/2003 | Kaul et al. | .................. | 544/233 |
| 6,793,723 B1 * | 9/2004 | Auslander et al. | ....... | 106/31.32 |
| 2002/0195586 A1 | 12/2002 | Auslander et al. | ..... | 252/301.16 |
| 2003/0005303 A1 | 1/2003 | Auslander et al. | .......... | 713/176 |
| 2003/0041774 A1 | 3/2003 | Auslander et al. | ....... | 106/31.32 |
| 2003/0209166 A1 * | 11/2003 | Vanmaele et al. | ....... | 106/31.27 |

FOREIGN PATENT DOCUMENTS

| | | |
|---|---|---|
| EP | 0348050 A1 | 5/1989 |
| EP | 0356080 A2 | 2/1990 |
| EP | 0468647 A1 | 1/1992 |
| EP | 0468647 B1 | 1/1992 |
| EP | 0356080 B1 | 8/1994 |
| EP | 06333142 A1 | 1/1995 |
| EP | 0994165 A1 | 10/1999 |
| EP | 0992550 A2 | 4/2000 |
| EP | 1035179 A1 | 9/2000 |
| EP | 1364994 A1 | 11/2003 |
| JP | 10007967 | 1/1998 |
| JP | 10-36735 | 2/1998 |
| JP | 10036733 | 2/1998 |
| JP | 11323230 A2 | 11/1999 |
| JP | 2000186227 | 7/2000 |
| JP | 2000289324 | 10/2000 |
| JP | 2000290563 | 10/2000 |
| JP | 2002129060 | 5/2002 |
| JP | 2002212472 | 7/2002 |
| WO | 95/17472 | 6/1995 |
| WO | WO9517472 A1 | 6/1995 |
| WO | WO02/057377 A1 | 1/2001 |
| WO | 02/085988 A | 10/2002 |

* cited by examiner

*Primary Examiner*—J. A. Lorengo
*Assistant Examiner*—Veronica Faison-Gee
(74) *Attorney, Agent, or Firm*—George M. Macdonald; Angelo N. Chaclas; Steven J. Shapiro

(57) ABSTRACT

In accordance with one embodiment of the present invention, a colorant in an ink jet ink formulation is disclosed. The colorant comprises an organic dye chromophore with at least one functional group Y containing one or more primary, secondary or tertiary amino groups, which in the presence of an acid provides a water soluble, cationic ink jet ink colorant with increased water fastness when applied to paper.

39 Claims, No Drawings

WATER SOLUBLE COLORANTS FOR INK JET PRINTING

BACKGROUND OF THE INVENTION

1. Field of the Invention

The present invention relates to water soluble colorants and, more particularly, to water soluble colorants for ink jet printing having improved water fastness on paper.

2. Background Information

In ink jet systems, highly water soluble colorants have advantages over pigment dispersions, such as better ink stability and fewer problems associates with jet clogging. However, conventional colorants often produce prints with lower water resistance on paper. Another problem is that ink formulations based on some conventional water soluble dyes may "bleed," wherein two colors printed side by side spread into each other before the ink has dried resulting in ill-defined borders.

Various methods have been proposed for improving the water resistance of water soluble dyes. For example, EPA 89-308157 discloses the conversion of carboxylic acid dyes, in their salt form, to the less soluble acid form on acidic paper. Zwitterionic dyes, whose molecules contain both strongly basic and acid groups, have also been proposed to improve water resistance. See WO 94-GB2637.

U.S. Pat. No. 5,919,846 discloses a colorant, which is the addition product of an organic chromophore having at least one reactive hydroxyl or amine substituent, a polyisocyanate, and a carboxylic acid, sulfonic acid, or salt of either thereof.

Despite previous work, there is a continuing need for water soluble colorants for ink jet printing having improved properties, such as water fastness, and for ink jet formulations employing such improved colorants.

SUMMARY OF THE INVENTION

In accordance with one aspect of the present invention, a colorant in an ink jet ink formulation is disclosed. The colorant comprises an organic dye chromophore with at least one functional group Y containing one or more primary, secondary or tertiary amino groups, which in the presence of an acid provides a water soluble cationic ink jet ink colorant with increased water fastness when applied to paper.

In accordance with another aspect of the present invention, a colorant in an ink jet ink formulation is disclosed. The colorant comprises an organic dye chromophore having at least two positive charges provided by one or more attached functional groups, Q, each containing one or more cationic quaternary ammonium functional groups, which provide a water soluble, cationic ink jet ink colorant, having increased water fastness when applied to paper.

In accordance with further aspects of the present invention, fluorescent ink jet ink printing formulations including the above colorants are disclosed.

Advantageously, inks employing the above colorants exhibit a high strike rate with a low tendency for lateral diffusion, and have excellent wet fastness properties. Accordingly, improved resistance to water of water soluble dyes used in water based ink jet inks are achieved with embodiments of the present invention.

A further advantage of embodiments of the present invention is the use of water insoluble dyes containing one or more primary, secondary or tertiary amino groups, which are temporarily solubilized in water by protonation with acids, and which then insolubilize on paper by returning to free amine state.

Moreover, a still further advantage of embodiments of the present invention is the use of water soluble dyes containing two or more positively charged quaternary ammonium groups. Applicants have determined that by increasing the number of positive charges on such dyes beyond 1, the wet fastness of the dye may be surprisingly improved. This is in contradiction to conventional thinking that such a structural change would lead to a lowering of the wet fastness due to increased water solubility of the dye.

Other embodiments, features and advantages will be apparent from: the following more detailed description, which illustrate by way of example the principles of the invention.

DETAILED DESCRIPTION

In accordance with an embodiment of the present invention, a water-soluble cationic ink jet ink colorant may be characterized by the product of a) a water insoluble organic dye chromophore having at least one primary, secondary or tertiary amino group attached as a side chain; and b) an acid.

Advantageously, in the presence of the acid, highly water soluble cationic colorants for ink jet inks are provided. On paper, these colorants exhibit a high "strike" rate with a low tendency for lateral diffusion, and have excellent wet fastness properties in ink formulations.

As used herein, the colorants may be considered to be water soluble if they provide stable (i.e. non-precipitating) solutions in water at concentrations of at least 0.1% or higher (by weight) without the aid of co-solvents or other additives at ambient temperatures (5–35° C.).

The organic dye chromophore may be any suitable chromophore exhibiting substantial color in the visible, infrared or ultraviolet range of the electromagnetic spectrum. Thus, virtually any organic chromophore may be employed. Examples of suitable organic dye chromophores include, but are not limited to, those in the following classes: azo, bisazo, hydrazone, anthraquinone, styryl, methine, triphenylmethane, xanthene, including rhodamines, benzopyranobenzimidazopyridine derivative, zinc phthalocyanine, copper phthalocyanine, oxazinium, phenothiazinium, phthalocyanine, porphyrin, coumarin, napthalimide, perylene, squaraine, cyanine, azacarbocyanine, hemicyanine, diethylaminepropyamine, methylpiperazine, and diazahemicyanine.

The water insoluble organic dye chromophore has at least one functional group, Y, which contains one or more primary, secondary or tertiary amino groups, and Y may be bonded directly to the organic dye chromophore, such as bonded directly to an aromatic or heterocyclic component of the chromophore. Alternatively, the functional group, Y, may be bonded to the chromophore by a linking group, X. The organic dye chromophore may comprise more than four functionalities, Y, with one to four being typical.

In a preferred embodiment, a water-insoluble amino-substituted dye may be represented by the general formula (I): [Chromophore]-[X—Y]$_n$, and preferred structures are those which readily dissolve in water on addition of any organic or mineral acid H$_m$A at a pH of about 3–6, giving a polycationic dye and the counter-anion A$^{m-}$.

The organic chromophore in the above formula may be as described above. Similarly, [X—Y]$_n$ in the above formula represents n side chains of X—Y, where n=1–4 and each.

[X—Y] may be the same or different, in which X is a group that links Y to the dye chromophore and Y is a moiety containing one to three primary, secondary or tertiary amino groups. More particularly, the linking group X in the side chain X—Y may be selected from the group consisting of: —SO$_2$—; —CO—; —NR$^1$(CH$_2$)$_m$—, where R$^1$ may be H, Me, Et, n-Pr, n-Bu, —CH$_2$CH$_2$OH, or —(CH$_2$)$_m$Y, and m=2 or 3; —CH$_2$; and

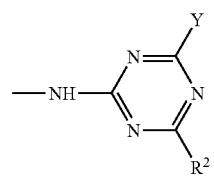

where R$^2$ may be —OH, —OMe, —OEt, —Cl, —NH$_2$, —NHMe, —NHEt, —NMe$_2$, —NEt$_2$, —NHCH$_2$CH$_2$OH, —NHPh, —N(CH$_2$CH$_2$OH)$_2$ or Y.

The amino or polyamino residue —Y may have any of the following structures (i)–(v):

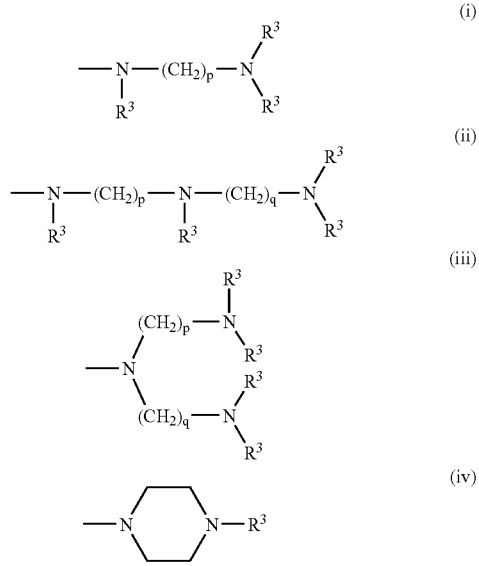

where R$^3$ may be any of the same or different, H, methyl, ethyl or —CH$_2$CH$_2$OH; and the integers p and q may be 2, 3 or 4; and in the case of X=—CH$_2$, Y may also be defined as any of:

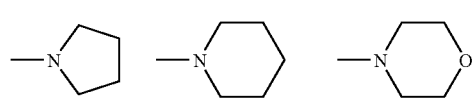

—NR$^4$R$^5$, where R$^4$ and R$^5$ may be the same or different and be any of H, Me, Et, n-Pr, n-Bu, —CH$_2$CH$_2$OH.

The acid employed may be any suitable acid, including salt thereof. Suitable examples include, but are not limited to, formic, acetic, glycolic, lactic, levulinic, gluconic, glucuronic, trifluroacetic, nitric, hydrochloric, phosphoric, sulphuric acids, and combinations thereof.

One skilled in the art may readily synthesize the above colorants through reaction between Y—H (a diamine, triamine or higher polyamine) and a derivative of the dye chromophore with reactive groups readily displaceable by nucleophiles, thereby introducing one or more functional moieties Y and producing a water insoluble chromophore having at least one primary, secondary or tertiary amino group attached as a side chain to the chromophore.

The suitable acid next may be added in excess of the number of primary, secondary or tertiary amino groups on the molecule to ensure that all such groups have been protonated. This may be accomplished by stirring the nonionic dye in water and adding the appropriate acid slowly until a pH of ca. 2–5 is reached, and continuing stirring until dissolution is complete. Heating may optionally be employed to accelerate the dissolution process.

Such dye solutions when applied to paper and air-dried give prints which are markedly more resistant to removal by water than conventional water soluble cationic and anionic ink jet colorants.

As an alternative to the protonation of the above dyes as a means of water solubilization and as a means of improving their water fastness on paper, the dye may also be converted to quaternary ammonium species. Accordingly, these preferred dyes may be represented by the general formula (II):

[Chromophore]-[P-Q]$_n$.

In this formula, [Chromophore] may also be defined as above. Similarly, [P-Q]$_n$ of this formula represents n cationic side chains of P-Q, where n=1–4 and each group [P-Q] may be the same or different, such that the overall charge on the molecule is greater than $^+$1. P represents a grouping which links Q to the dye chromphore and Q is a moiety preferably containing one to three quaternary ammonium groups. The organic dye chromophore may comprise more than one functionality, Q, with one to four being typical. Similarly, Q may contain more than one quaternary ammonium groups, with one to three being typical.

More particularly, the linking group P in the side chain P-Q may be selected from the group consisting of: —SO$_2$—; —CO—, —CH$_2$; and —NR$^6$(CH$_2$)$_m$—, where R$^6$ may be H, Me, Et, n-Pr, n-Bu, —CH$_2$CH$_2$OH, or —(CH$_2$)$_m$Q and m may be 2 or 3.

The cationic residue Q in the above formulae may have any of the following structures (vi)–(ix):

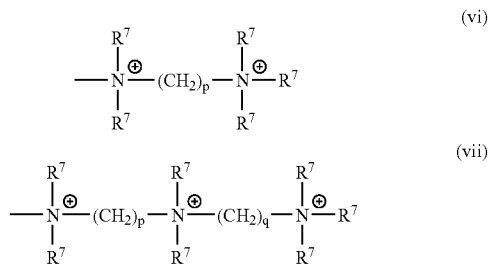

-continued

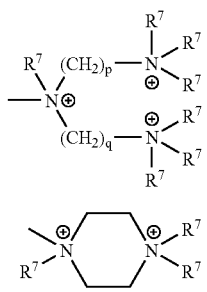

(viii)

(ix)

where R⁷ may be any of the same or different of Me, Et, n-Pr, n-Bu or —(CH₂CH₂)H, and the integers p and q may be 2, 3 or 4. In instances, where —P is —CH₂ or —NR⁶ (CH₂)$_m$, with R⁶ and m as defined above, additional structures for Q include (x)–(xii):

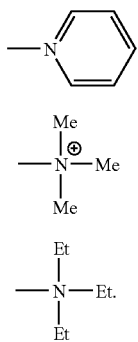

(x)

(xi)

(xii)

The dyes of structure (II) preferably readily dissolve in water without requiring addition of an acid. Accordingly, the dyes of structure (II) may be associated with counter-anions, which may be derived from any suitable organic or inorganic acid, where such anions confer good water solubility. Suitable counter-anions include, but are not limited, to formate, acetate, glycolate, lactate, levulinate, gluconate, glucoronate, trifluoroacetate, nitrate, chloride, phosphate and sulphate.

Advantageously, in accordance with embodiments of the invention, colorants for ink jet ink formulations are provided comprising an organic dye chromophore having at least two cationic ammonium functional groups which provide a water soluble cationic ink jet ink colorant with increased water fastness when applied to paper, without the need for added acid.

One skilled in the art may readily synthesize dyes of general structure (II) by, for example, reacting nonionic amino dyes of general structure (I) as described previously with alkylating agents, thereby converting the primary, secondary or tertiary amino groups in (I) into quaternary ammonium groups. Alternatively, dyes possessing more than one substituent that is reactive towards nucleophilic displacement can be reacted with tertiary amines as a means of introducing quaternary ammonium groups directly.

EXAMPLES

A) Neutral Polyamino Dyes

The following dyes are encompassed by general structure (I), in which X=—SO₂—.

1. Phthalocyanines of the Formula (1a) and (1b):

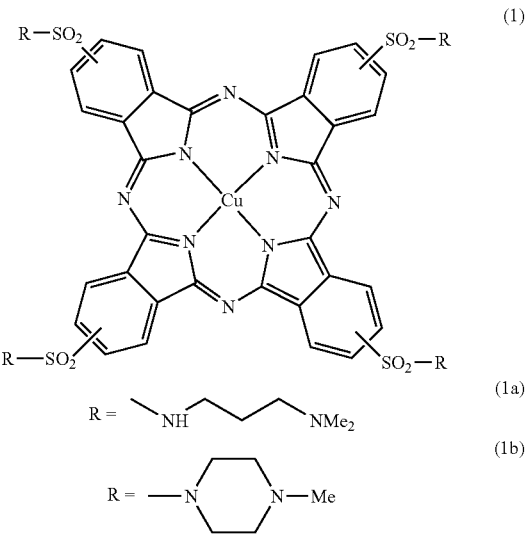

Synthesis: Copper phthalocyanine (0.02 moles) was stirred in chlorosulfonic acid (100 ml) at 130–135° C. for 18 hours. The solution was cooled to 50° C. and thionyl chloride (20 ml) added slowly. The solution was stirred at 100° C. for 3 hours, and then cooled, poured onto ice, and the solid filtered off. This was washed with water and dried in a vacuum desiccator, giving the tetrasulfonyl chloride as a dark blue powder.

The copper phthalocyanine tetrasulfonyl chloride (10 g) was dissolved in DMF (30 ml), and to this was added an excess of the appropriate amine (3-dimethylamino-propylamine in the case of (1a), or N-methylpiperazine in the case of (1b)) (6 g). Pyridine (5 ml) was then added and the mixture stirred at room temperature for 24 hours. The bulk of the solvent was evaporated under vacuum, and the residual viscous solution poured into 150 ml water.

The deposited solid (1a) or (1b) was filtered off, washed with a little cold water and dried.

Both (1a) and (1b) were insoluble in water but dissolved readily on addition of excess acid, e.g. hydrochloric or acetic acid. The solutions gave blue prints with excellent wet fastness on paper.

2. Coumarins of the Formula (2a) and (2b):

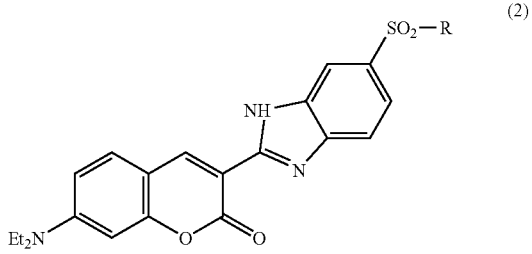

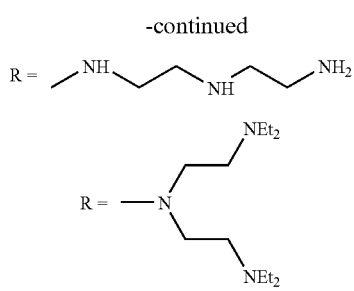

The coumarin-7-sulfonic acid (2, R=OH)(10 g) was stirred in chlorosulfonic acid (40 ml) for 24 hours at room temperature. The solution was poured carefully onto ice and the resultant yellow suspension filtered and the insoluble sulfonyl chloride (2, R=Cl) was isolated.

The coumarin-7-sulfonyl chloride (2, R=Cl) (10 g) was stirred in DMF (100 ml) together with the appropriate amine RH (excess; 8 g) and pyridine (10 ml) for 12 hours at room temperature. Sodium hydrogen carbonate was optionally added during the reaction to ensure basic conditions throughout. The bulk of the solvent was evaporated under vacuum, and the residual viscous solution poured into 200 ml water. The deposited yellow solid (2a) or (2b) was filtered off, washed with a little cold water and dried.

Both (2a) and (2b) were insoluble in water, but dissolved readily on addition of acids. The solutions gave bright yellow prints on paper with excellent wet fastness.

3. Rhodamine of the Formula (3):

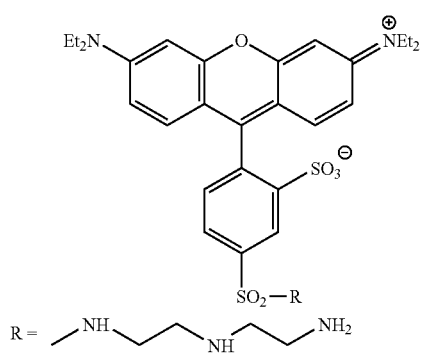

The disodium salt of Sulforhodamine B (3, R=ONa) (1 g) was stirred in a mixture of acetonitrile (20 ml), dimethylacetamide (5 ml) and POCl$_3$ (10 ml) at 60° C. for 2 hours. The deep red solution was cooled to room temperature and poured onto ice. Filtration of the suspension gave the sulfonyl chloride (3, R=Cl) as a bright red solid.

The sulfonyl chloride (1 g) was dissolved in a mixture of dichloromethane (25 ml) and DMF (25 ml), and 2 molar equivalents of the amine was added. Sodium hydrogen carbonate (3 molar equivalents) was added as acid binder, and the mixture was stirred at room temperature for 12 hours. The bulk of the solvent was then evaporated under vacuum, and the residual viscous solution poured into 50 ml water. The deposited red solid (3) was filtered off, washed with a little cold water and dried. The solid dissolved readily in water with addition of hydrochloric or acetic acid, to give deep fluorescent red solutions. The solutions gave red prints on paper with excellent wet fastness.

4. The Rhodamine of Formula (4)

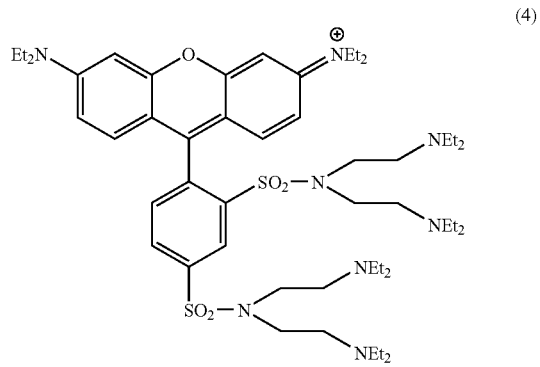

Sulforhodamine B (1 g) was refluxed in 50 ml POCl$_3$ for 12 hours, and then the phosphorous oxychloride was removed as much as possible under vacuum. Ice was added with thorough stirring, and the solid product filtered off and dried at the pump, giving the bis-sulfonyl chloride derivative of Rhodamine B. This was dissolved in dichloromethane (50 ml) and stirred with 1 g anhydrous magnesium sulphate (to absorb water) and 1 g sodium hydrogen carbonate (to neutralize acid produced in the amination reaction). A small amount of DMF was also added to aid solubility. Tetraethyldiethylenetriamine (0.77 g, 2 molar equivalents) was then added and the solution stirred at room temperature for 12 hours. Most of the solvent was then evaporated under reduced pressure, and water (100 ml) was added, together with NaCl. The product (4) was filtered off as a dark red solid. This was readily soluble in dilute aqueous acids, and the solutions gave red prints on paper with high wet fastness.

5. The Benzopyranobenzimidazopyridine Derivative of the Formula (5):

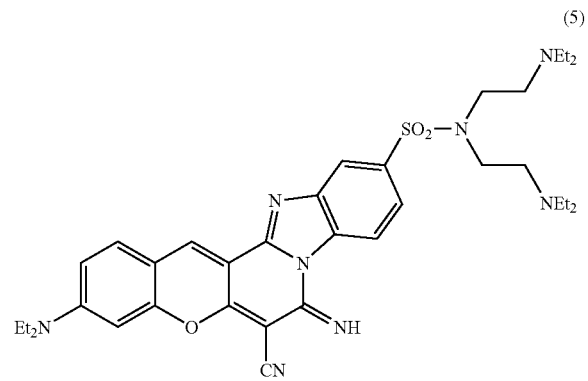

The sulfonic acid precursor of (5) (4 g) was refluxed in POCl$_3$ (50 ml) for 12 hours to give the sulfonyl chloride. Most of the POCl$_3$ was removed under vacuum, and ice was added to the residue, and the deposited sulfonyl chloride was filtered off. A portion of the dried product (1 g) was dissolved in a mixture of dichloromethane (25 ml) and DMF (25 ml), and 2 molar equivalents of tetraethyl-diethylenetriamine was added. Sodium hydrogen carbonate (3 molar equivalents) was added as acid binder, and the mixture was stirred at room temperature for 12 hours. The bulk of the solvent was then evaporate under vacuum, and the residual viscous solution poured into 50 ml water. The deposited red solid (5) was filtered off, washed with a little cold water and dried. This was moderately soluble in water with addition of hydrochloric or acetic acid, to give a fluorescent red solution, which gave prints on paper with excellent water fastness.

B) Quaternized Polycationic Dyes

The following dyes are encompassed by general structure (II).

6. The Zinc Phthalocyanine of the Formula (6):

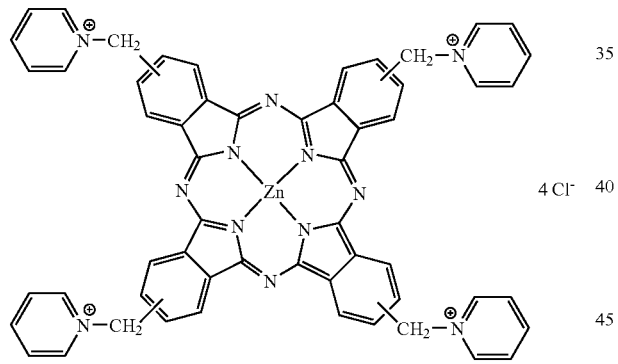

Paraformaldehyde (60 g) was added to a mixture of sulfuric acid (80 g) and chlorosulfonic acid (267 g) at 0° C. over 1 hour, and then stirred for a further 20 minutes. Ground sodium chloride (10 g) and zinc pthalocyanine (10 g) was added slowly with cooling over 1 hour. The mixture was stirred at 80° C. for 12 hours, cooled and poured carefully over ice. The precipitated blue tetrachloromethyl derivative was filtered off and dried (yield 19 g).

A portion of the product (10 g) was refluxed in pyridine (50 ml) for 20 minutes. Water (100 ml) was added and refluxing continued for 15 minutes. The solution was cooled and poured into acetone (400 ml) and the deposited dye (6) filtered off as the dark blue chloride salt. This was very soluble water, and the solutions gave blue prints on paper with excellent water fastness.

7. Copper Phthalocyanine of the Formula (7a) and (7b):

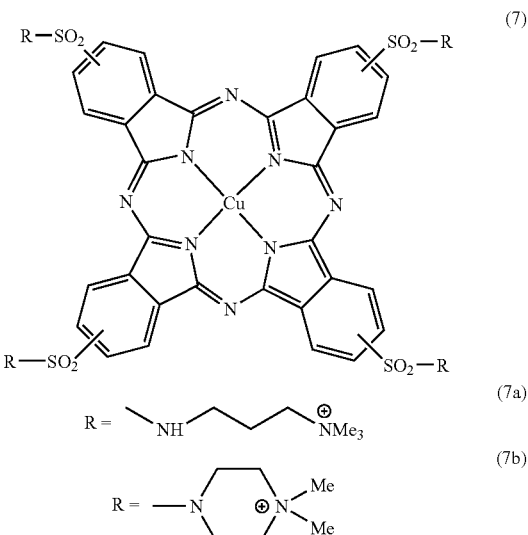

The dyes (7a) and (7b) were prepared respectively by alkylation of their neutral amino precursors (1a) and (1b) described previously. Thus, (1a) (10 g) was stirred in DMF (50 ml) with dimethyl sulphate (6 g) and magnesium oxide (1 g), at 60° C. for 2 hours. Water (10 ml) was then added and the solution stirred for a further hour to destroy excess dimethylsulphate. Most of the solvent was evaporated off and the solution poured into excess acetone (300 ml). The sold was then filtered off and dried, giving (7a) as its methyl hydrogensulfate salt (Yield=7.8 g).

Dye (1b) (6 g) was methylated using the same procedure, giving the tetra-cationic dye (7b) (Yield 11.2 g). The dye methylhydrogensulfate salts (7a) and (7b) were readily soluble in water, and the solutions gave intense blue prints on paper with excellent water fastness.

8. Coumarins of the Formula (8a) and (8b):

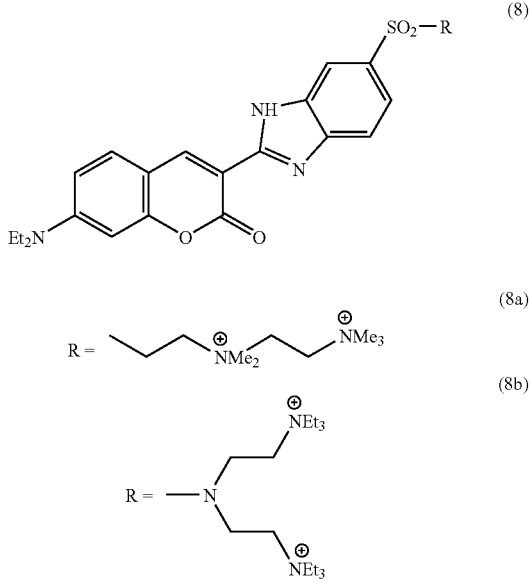

Synthesis of (8a)

The coumarin 7-sulphonyl chloride (2, R=Cl) (1 g) was dissolved in DMF (30 ml) and the solution was added to a solution of diethylenetriamine (0.21 g) in dichloromethane (10 ml). The mixture was stirred at room temperature overnight, and then poured into a large excess of water and the product filtered off. The sold was dissolved in a mixture of acetone (20 ml) and DMF (20 ml). Dimethylsulfate (2 g) and magnesium oxide (1 g) were added, and the solution stirred at 80° C. for 3 hours. The solution was poured into water to give a yellow suspension, which was boiled for 1 hour and filtered to remove insoluble yellow material. The resultant deep yellow aqueous solution of 8a gave yellow prints on paper with very good water fastness.

Synthesis of (8b)

A sample of the diamino substituted coumarin (2b) described previously (3.5 g) was dissolved in acetone (100 ml) with one equivalent of dimethyl sulfate, and heated under reflux for four days. The solvent was evaporated in vacuum and the residue digested with boiling water to extract the product (8b). The filtered aqueous solution of (8b) when applied to paper gave yellow fluorescent prints with high water fastness.

9. Rhodamine of the Formula (9a) and (9b):

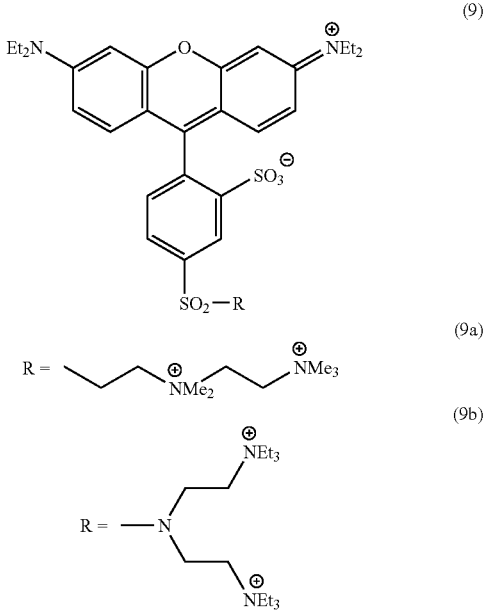

Synthesis of (9a)

The mono-acid chloride of Sulforhodamine B (3, R=Cl) (0.2 g) was dissolved in dichloromethane (10 ml) and added dropwise to a solution of diethylenetriamine (0.04 g) in dichloromethane (10 ml). The solution was stirred at room temperature for 3 hours and the solvent then evaporated under reduced pressure. The residue was dissolved in acetone (20 ml), to which dimethyl sulfate (0.5 g) and magnesium oxide (ca. 1 g) was added. The suspension was refluxed for 3 hours, during which time a little DMF (5 ml) was added to aid solubility. After reaction, the excess dimethyl sulfate was decomposed by adding water and heating for 30 minutes. The solvent was evaporated in vacuum, and the solid re-dissolved in water and filtered, giving a deep red solution of the cationic dye (9a). This gave prints on paper with very good water fastness.

Synthesis of (9b)

The mono-acid chloride of Sulforhodamine B (3, R=Cl) (0.8 g) was stirred in a mixture of acetone (20 ml) and DMF (10 ml) at room temperature (RT). Bischloroethylamine (0.25 g, 1 equivalent) was added and stirring continued for 15 hours. Tlc analysis showed complete reaction had taken place. The solvent was evaporated off and the solid dried. This was dissolved in ethanol (100 ml) and transferred to an autoclave chamber. Triethylamine (100 ml) and a catalytic amount of potassium iodide (~0.2 g) was added, and the solution stirred at 150°, under pressure, for 4 hours. The solution was allowed to cool and the product (9b) was extracted into water. After evaporation of the solvent under reduced pressure this gave (9b) as a waxy red solid, exhibiting good water solubility, and the solutions showing very good water fastness when printed on paper.

10. The Rhodamine of Formula (10)

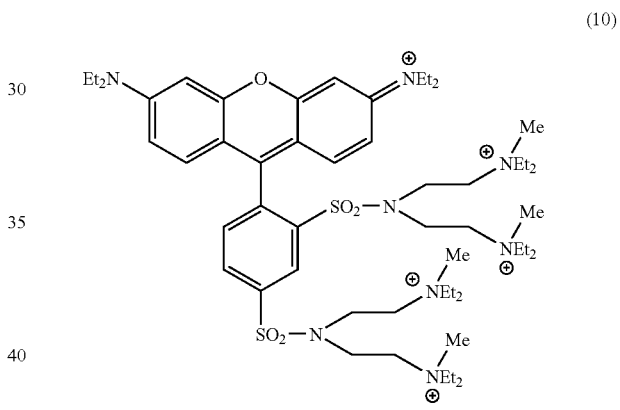

The rhodamine derivative (4) described previously (1 g) was refluxed in acetone (40 ml) containing dimethyl sulfate (4 g) and magnesium oxide (5 g) for 12 hours. After addition of 50 ml water and boiling to destroy excess dimethyl sulfate and to evaporate the acetone, the mixture was filtered to give an intensely red solution of (10). This gave purple-red prints on paper with excellent water fastness.

Note, in (7–10) above, the counterions will be $MeSO_4^-$ and/or $SO_4^{2-}$.

The colorants may be used to color or print various substrates, preferably paper substrates. Suitable paper substrates include, but are not limited to, coated or uncoated cellulose-based sheets of any bond type.

The colorants provide excellent contrast and stabililty within ink formulations, including aqueous solutions. Also, these colorants are very water fast, wash fast, color fast, and provide permanent colorations to substrates, such as cellulose-based paper.

According to further aspects of the invention, ink formulations are provided comprising a colorant and a liquid medium, such as water and one or more organic solvents, among other optional suitable constituents. Preferably, the colorant is completely dissolved in the liquid medium to form a solution.

In the preferred application of ink jet printing, the colorants may be diluted with a number of solvents including, but not limited to, water, ketones, acetates, glycols, glycol ethers, alcohols, and mixtures thereof. Preferably, the colorants are diluted with organic, non-aqueous solvents, such as polyvinylprrolidone, triethylene glycol mono butyl ether, diethylene glycol, dipropyline glycol, methyl ethyl ketone, or any other standard ink-jet diluent or mixture of diluents. It may also be possible to dilute the colorant with water alone, prior to use. The final weight percent of the colorant in the ink formulation may vary, but typically may be from about 0.1 to about 15 weight percent of the formulation, and preferably from about 1.0 to about 10 weight percent.

Other constituents may be employed within the ink formulations, such as those disclosed in U.S. Pat. Nos. 6,005,002, 5,674,314 and 5,919,846, and U.S. Publication Numbers 2002/0195586A1, 2003/0005303A1 and 2003/0005303A1, the contents of which are incorporated by reference.

As a non-limiting example, the ink carriers for the colorants used in the ink formulations may contain at least about 65 wt. % water. Other suitable solvents/additive categories may include the following: fluorescence stabilizers (FS), which are additives for maintaining and enhancing fluorescence. The fluorescence of low viscosity inks that do not contain pigments decreases as the ink penetrates the paper. Accordingly, there is a need for additives that will help maintain a constant level of fluorescence. The following solvents provide a considerable enhancement of fluorescence: N,N-Dimethylacetamide, sulfolane, formamide, methylphenyl sulfoxide, N-methylpyrrolidinone, 4-Methylmorpholine N-oxide (MNNO) and Dimethylsulfoxide (DMSO). From the foregoing list, MNNO is believed to have the best ability to achieve long term increased fluorescence. MNNO is a known solvent for cellulose and aids penetration into the fibers of the paper, which may increase the fluorescence in a selective and long lasting manner.

Polar low molecular weight resins (PLMWR), such as polyvinylpyrrolidone (MW 15000) and polyethyleneglycols, may also be employed in the ink formulations to enhance and stabilize the fluorescence. Other water soluble resins with good solvent characteristics for dyes include polyvinylalcohol, poly N,N-dimethylhydantoin, polyacrylates, among others.

The ink formulations may further include surfactants (S), such as long chain surfactants of dodecylbenzenesulphonic acid.

Glycol ethers (GE), such as triethylene glycol mono butyl ether (BTG), may also be included to enhance color and fluorescence by internal hydrogen bonding and improved penetration into the paper. Other suitable glycols include triethylene glycol n-butyl ether (BTG), tripropylene glycol methul ether (TPM), diethylene glycol n-butyl (DB), diethylene glycol methyl ether (DM), dipropylene glycol methul ether (DPM).

Other constituents, such as amines (A), may be included in the ink formulations to, for instance, prevent the aggregation of the dyes, improve solubility in water/glycol/ether mixtures and help to maintain constant viscosity during long periods of rest. Suitable amines include triethanol amine, ethanol amine, diethanolamine, trisopropanolamine, butyldiethanolamine, N,N dimethylethanolamine, N,N diethylethanolamine, N,N dipropylethanolamine, among others.

Ink formulations including the afore-described colorants may be made by any suitable method known in the art. For example, the ink formulations may be obtained by addition of the highest percentage component by weight of stock solutions prepared from all components in water until completely dissolved into a container, and then subsequent additions of the largest percent by weight component until all of the components are added to a mixing container. The ink may be vacuum filtered with use of conventional filters, such as a 5-micron polyvinylidene fluoride membrane filter from Millipore, to remove any large solids prior to printing. The ink formulation constituents may be combined and stirred until a homogeneous ink formulation is obtained.

Ink formulations employing Applicants' colorants are particularly useful in producing dark, machine-readable markings exhibiting fluorescence when exposed to fluorescent-excitation radiation upon printing by ink jet printing mechanisms.

The present invention will be further described by way of example, which is meant to be merely illustrative and therefore not limiting.

Example 1

This example illustrates the preparation of ink formulations of the present invention, Samples A–B, in comparison with Sample X, which is an ink formulation including the constituents of Example 6 of US 2002/0195586A1, but excluding the surfactant, dodecylbenzenesulphonic acid, and black dye, Millijet 2000, employed in that example.

The following components were combined and mixed using a magnetic stirrer until homogeneous ink formulations were obtained for each sample.

| Constituent | Sample X (Wt. %) | Sample A (Wt. %) | Sample B (Wt. %) | |
|---|---|---|---|---|
| Distilled Water | 82.36 | 75.34 | 74.53 | Water |
| Pryanine 120 | 1.37 | 1.35 | 1.34 | Yellow Dye |
| Acid Yellow 7 | 0.22 | 0.37 | 0.32 | Yellow Dye |
| Acid Red 52 | 0.40 | 0.43 | 0.39 | Red Dye |
| Triethanolamine | 0.18 | 0.30 | 0.23 | Amine |
| Polyvinylpyrrolidone, PVP (K12) | 5.89 | 5.80 | 5.73 | Polar Low Molecular Wt. Resin |
| 4-Methylmorpholine N-oxide (MMNO) | 2.47 | 2.77 | 2.57 | Fluorescence Stabilizer |
| Triethylene Glycol Mono Butyl Ether (BTG) | 6.22 | 6.74 | 6.84 | Glycol Ether |
| Millijet Blue 28 | 0.89 | — | — | Blue Dye |
| CuPc [MethylPiperazine]$_4$ Quarternzied (Sample B) | — | — | 2.53 | Colorant |

-continued

| Constituent | Sample X (Wt. %) | Sample A (Wt. %) | Sample B (Wt. %) | |
|---|---|---|---|---|
| CuPc [diethylaminepropy-amine]-HCL (Sample A) | — | 1.34 | — | Colorant |
| Citric Acid | — | 5.57 | 5.51 | Acid |
| Total | 100 | 100.00 | 100.00 | |

As shown in the table set forth below, the sample inks were evaluated for liquid properties, such as viscosity, pH and surface tension. Physical properties, such as reflectance, were also evaluated.

Test Results

| Test Parameter | Sample X | Sample A | Sample B |
|---|---|---|---|
| Ink Properties | | | |
| Viscosity (cp) | 2.32 | 3.0 | 2.8 |
| pH | 7.54 | 3.15 | 2.89 |
| Surface Tension (dyne/cm) | 39.8 | 38.8 | 44.2 |
| Drawdown PMU | 64 | 46 | 48 |
| Drawdown OD | 0.59 | 0.64 | 0.61 |
| Water Fastness Test | | | |
| *Reflectance Ratio | 2 | 6 | 6 |
| **Modulation R | 0.50 | 0.90 | 0.92 |
| **Modulation G | 0.57 | 0.68 | 0.69 |
| **Modulation B | 0.71 | 0.79 | 0.82 |

The foregoing results advantageously demonstrate the surprisingly improved water fastness of the ink formulations of the present invention, as indicated by the higher modulations values of Samples A and B. These modulations, as well as the testing procedures employed, are further described below.

Drawdown Preparation

The drawdown equipment included a wire wound rod #1 (Yellow Handle-0.08 mm wire diameter), KCC101 Coater or similar drawdown apparatus, Printmaster No. 10 White Wove envelopes supplied by Old Colony or others, Pasteur pipettes or eyedroppers and cellophane tape.

A drawdown of ink sample was prepared by cutting several envelopes into 2×11 inch strips and then securing the paper samples on the surface of the KCC101 Coater. A setting bar was then used, as described in the KCC101 manual, to create even pressure across the KCC101 surface. The rod was then placed in the unit. A 1.5 inch long piece of cellophane tape was placed across the paper strips below and parallel to the rod. The test ink sample was then distributed evenly across the cellophane tape. The speed of the KCC101 Coater was set to setting #10 (12 m/min) and the drawdown motor switch moved to the forward position. The drawdown samples were then removed and allowed to dry for 24 hours before taking measurements.

Optical Density (OD)

The optical density of the drawdown samples and prints were measured with use of a X-Rite densitometer having an orthochromatic filter. Several strips of the white wove envelope were used under each drawdown to insure that the background was consistent and did not affect the measurements. Fiver different areas were sampled and the resulted averaged.

Fluorescence (PMU)

The fluorescence intensity of the drawdown samples and prints were measured using a United States Postal Service supplied (USPSS) LM-2C Luminescence Meter. The LM-2C measures fluorescence as a result of excitation with a pulsed short wavelength ultraviolet lamp (254 nm). The relative strength of the emission is displayed in Phosphor Meter Units (PMU). The PMU displayed is proportional to the energy collected by the detectors through a 5.2 $cm^2$ aperture window, and a PMU reading of 15 is considered acceptable for postal sorting operations.

The unit has a portable standard plate containing a 3.2 cm diameter circular red fluorescent wafer for calibration purposes. The plate with the wafer is placed on the unit with the circular wafer completely encompassing the read window. The wafer has a specific red fluorescent intensity value near the mid range of 61 PMU for this particular test unit and a full scale reading of 99 PMU. Each PMU unit has its own calibration plate, but all red fluorescent wafers are in the range of 59–65 PMU. The instrument can be manually adjusted to meet the wafer value.

The 15 PMU imprint value is dependent upon the intensity of the fluorescent material contained in the ink, type of envelope paper, graphic design of the printing elements, such as 2-D bar code, indicia, postage values, date, and total solid area captured through the unit's window. The larger the total solid area, the greater the PMU value. The LM-2C is designed with internal filters so that only specific emission wavelengths are allowed to reach the detectors (560 nm–660 nm).

Five readings were obtained for each sample and the results averaged.

Viscosity

Viscosity of the liquid inks was measured using a Haake VT550 Viscotester having a NV rotor and cup sensor system. The NV sensor system includes a cup and a bell shaped rotor, and is classified as a coaxial cylinder sensor system with two gaps for sheering the samples on the inside and outside of the rotor.

The procedure used to measure viscosity was as follows: A temperature control bath attached to the viscometer was set to 25° C. and the test samples allowed to equilibrate at the bath temperature for 10 minutes. The viscosity of the ink samples was measured using variable rotor speeds from 50 $sec^{-1}$ to 3500 $sec^{-1}$. This gives a stress strain-relationship from which the viscosity can be calculated by measuring the slope. The viscometer-supplied software provided the viscosity value.

pH

The pH of the liquid samples was measured using an Orion EA 920 pH Meter with a 8135BN flat surface electrode. The pH meter was calibrated with National Institute of Surface Technology (NIST) certified buffer solutions of pH 5, 7 and 10 before any measurements were recorded.

Surface Tension

The surface tension of the liquid samples was measured using the DuNouy method with a Fisher Surface Tensiomat having a platinum iridium ring. The instrument was calibrated by measuring the surface tension of pure water (American Chemical Society reagent grade), which was found to be in the range of 72 dynes/cm+0.5 dynes/cm at room temperature of 25° C.

Reflectance and Modulation

The Reflectance and Modulation of the samples were determined as follows:

* Reflectance Ratio
  1. Prepare sample using Epson C82 printer.
  2. Reflectance was measured for printed area and paper using Macbeth PCM with filter A, and values are recorded as $R_{ink\ initial}$ and $R_{paper}$, respectively.
  3. Printed sample with a solid area was soaked in distilled water for 5 minutes, taken out, and dried.
  4. Reflectance was measured for printed solid area after soaking, and value is recorded as $R_{ink\ final}$.
  5. Reflectance ratio was calculated based the equation: Ratio=$[(R_{paper}-R_{ink\ initial})/(R_{paper}-R_{ink\ final})*10]$.
  6. The ratio scale is from 0 to 10. Ratio of 10 is best.

** Modulation
  1. Prepare a test pattern with three evenly separated solid bars using Epson C82 printer.
  2. Measure the C- M- Y- values for nine positions of printed bars and unprinted paper below the corresponding bar area using X-Rite 500 Spectrodensitometer, and calculate the R-, G-, and B- values; record as $R_{ink\ before}$ and $R_{paper\ before}$, respectively.
  3. Run a small volume of water (100 μl) over the printed pattern at different positions, and let pattern dry at room temperature.
  4. Measure the same positions as Step 2 after pattern was wetted with water and dried; record as $R_{ink\ after}$ and $R_{paper\ after}$, respectively.
  5. The averages of R-, G-, B- values for nine positions for both printed bar and unprinted paper are obtained, and Modulation is calculated for R, G, and B, respectively, based on the following equation.

Modulation=$(R_{paper\ after}-R_{ink\ after})/(R_{paper\ before}-R_{ink\ before})$.

Inks useful in ink jet printers require a combination of advantageous properties to be effective. For example, suitable inks should have stable solutions or dispersions with low viscosity and specified surface tension. The viscosity of the liquid ink jet inks may typically be from 1.5 to 15 centipose (cps) in current piezoelectric ink jet printers and about 1 to 5 cps in thermal ink jet printers. A desirable range of surface tension for ink jet printer inks is between 30 to 50 dynes/cm. Samples A and B of the present invention, advantageously meet this desired criteria, as shown by the values in the above table.

Moreover, as further shown in the above table, Samples A and B of the present invention exhibited improved water fastness, as indicated by the higher modulation values in comparison with Sample X.

Advantageously, as demonstrated by the above, embodiments of the present invention provide black fluorescent ink formulations exhibiting improved properties, such as improved water fastness. These ink formulations are particularly useful for the ink jet printing applications described in US 2002/0195586A1, such as postal applications.

Embodiments of the present invention also advantageously provide fluorescent ink jet inks that are visibly dark and give high print contrast, as also demonstrated by the above example.

Set forth below is a further non-limiting example illustrating advantages of embodiments of the present invention.

Example 2

This example demonstrates a comparison of water/light fastness for ink formulations of the present invention (Sample A and B dyes) in comparison with acid blue dye 9. As shown by the test results below, in general, water and light fastness for ink formulations of the present invention were superior to ink formulations with acid blue dye 9. Additionally, Applicants' dyes did not precipitate out when the pH of the ink was adjusted from 2.5 to 7.4. The testing procedures employed were also similar to those described above for Example 1.

|  | Ink with Blue Dye | |
| --- | --- | --- |
| Components | Sample A Wt (%) | Acid Blue 9 Wt (%) |
| Formulation of Inks | | |
| Distilled Water | 64.4 | 66.6 |
| PEG 200 (Aldrich) | 9.4 | 9.7 |
| 2-Pyrrolidinone (Aldrich) | 11.4 | 11.8 |
| Triethanolamine (TEA)* | 0.69 | 0.29 |
| CuPc[diethylaminepropyamine].HCL (Sample A) | 4.73 | — |
| Acid Blue 9 | — | 1.86 |
| Polyvinylpyrrolidone, PVP (K12) | 4.0 | 4.2 |
| Triethylene Glycol Mono Butyl Ether (BTG) | 5.4 | 5.5 |
| Total | 100 | 100 |
| Ink Properties | | |
| OD (Drawdown) | 0.33 | 0.32 |
| Surface Tension (dyne/cm) | 35.1 | 47.2 |
| pH | 7.16 | 8.41 |
| Viscosity (cp) | 4.03 | 3.45 |
| Modulation (Water fastness) | | |
| R | 0.82 | 0.53 |
| G | 0.83 | 0.44 |
| B | 0.78 | 0.45 |
| Reflectance Ratio (Water fastness) | 9.6 | 2.1 |

*For ink with sample A, TEA was added to adjust pH from 2.50 to 7.16 at the last step.

|  | Ink | | |
| --- | --- | --- | --- |
| Components | Acid Blue 9 Wt (%) | A Wt (%) | B Wt (%) |
| Formulation of Inks | | | |
| Distilled Water | 80.9 | 76.1 | 73.0 |
| Ethylene Glycol | 4.55 | 4.28 | 5.47 |
| Glycerol | 6.06 | 5.70 | 6.02 |
| Triethanolamine (TEA) | 0.30 | — | — |
| CuPc[diethylaminepropyamine].HCL | — | 1.03 | — |

-continued

| Components | Ink Acid Blue 9 Wt (%) | A Wt (%) | B Wt (%) |
|---|---|---|---|
| (Sample A) | | | |
| CuPc[Me Pip]4 Q (Sample B) | — | — | 8.21 |
| Triethylene Glycol Mono Butyl Ether (BTG) | 6.47 | 6.08 | 5.84 |
| Citric Acid | — | 1.5 | 1.5 |
| Acid Blue 9 (Pylam) | 1.77 | — | — |
| Total | 100 | 100 | 100 |
| Ink Properties | | | |
| OD (Drawdown) | 0.31 | 0.34 | 0.30 |
| Viscosity (cp) | 1.72 | 2.14 | — |
| pH | 8.1 | 2.0** | 2.0** |
| Modulation (Water fastness) | | | |
| R | 0.57 | 0.97 | 0.92 |
| G | 0.53 | 0.98 | 0.83 |
| B | 0.52 | 0.92 | 0.76 |
| Reflectance Ratio (Water fastness) | 3.0 | 9.8 | 9.1 |
| Light Fastness (Blue Wool #2, Grey #4) | | | |
| L*, before exposure to UV | 53.34 | 55.11 | 60.09 |
| a*, before exposure to UV | −26.11 | −18.87 | −19.18 |
| b*, before exposure to UV | −42.11 | −37.79 | −38.91 |
| ΔL* | −0.1 | 0.63 | −0.65 |
| Δa* | 2.67 | −0.74 | −0.23 |
| Δb* | 10.33 | 3.77 | 1.89 |
| Color Change (ΔE) | 10.7 | 3.9 | 2.0 |

**pH for Inks with Applicants' samples was adjusted from 2.0 to 7.4 with TEA, no precipitation was observed.
$\Delta E = [(\Delta L^*)^2 + (\Delta a^*)^2 + (\Delta b^*)^2]^{1/2}$ The Reflectance and Modulation of the samples were determined, as described above in Example 1. Regarding the light fastness, ATLAS SUNTEST XLS* was used, and the test settings were as follows: irradiance-514 w/m², Temperature—63° C., Duration—4 hours nonstop.

Embodiments of the present invention also provide homogeneous aqueous ink formulation comprising a first colorant comprising at least one fluorescent dye; a second colorant comprising the inventive colorants described herein; and an aqueous liquid vehicle comprising water and an organic solvent. Advantageously, the ink formulation has an ink viscosity and surface tension effective for application of the ink to a cellulose substrate in a predetermined pattern by ink jet printing.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A colorant in an ink jet ink formulation, the colorant comprising an organic dye chromophore with at least one functional group Y containing one or more primary, secondary or tertiary amino groups, which in the presence of an acid provides a water soluble, cationic ink jet ink colorant with increased water fastness when applied to paper.

2. The colorant of claim 1, further comprising a linking group, X, between the organic chromophore and the amino functional group, Y.

3. The colorant of claim 2, comprising between 1 to 4 functional groups, Y, as side chains or attached to side chains.

4. The colorant of claim 3, wherein the organic dye chromophore is selected from the group consisting of azo, bisazo, hydrazone, anthraquinone, styryl, methine, triphenylmethane, xanthene, including rhodamines, zinc phthalocyanine, copper phthalocyanine, benzopyranobenzimidazopyridine derivative, oxazinium, phenothiazinium, phthalocyanine, porphyrin, coumarin, napthalimide, perylene, squaraine, cyanine, azacarbocyanine, hemicyanine, diethylaminepropyamine, methylpiperazine, and diazahemicyanine chromophores.

5. The colorant of claim 3, wherein Y comprises one to three primary, secondary or tertiary amino groups and Y is selected from the group consisting of:

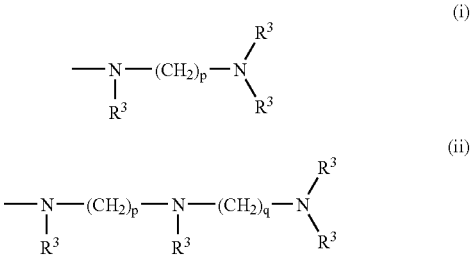

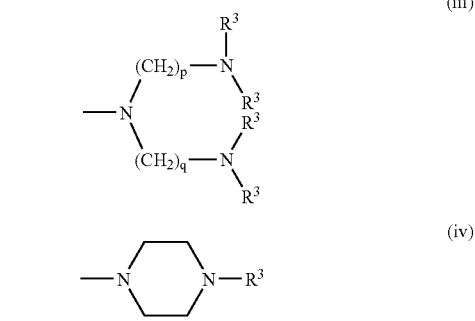

where R³ is, same or different, H, methyl, ethyl or —CH₂CH₂OH; and p and q are 2, 3 or 4.

6. The colorant of claim 5, wherein the linking group, X is selected from the group consisting of: —SO₂—; —CO—; —NR¹(CH₂)$_m$—, where R¹ is H, Me, Et, n-Pr, n-Bu, —CH₂CH₂OH, and —(CH₂)$_m$Y, and m=2 or 3; —CH₂; and

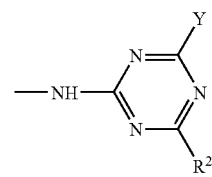

where R² is —OH, —OMe, —OEt, —Cl, —NH₂, —NHMe, —NHEt, —NMe₂, —NEt₂, —NHCH₂CH₂OH, —NHPh, —N(CH₂CH₂OH)₂ or Y.

7. The colorant of claim 6, wherein in the case of X=—CH₂, Y is selected from (i)–(iv) above and

—NR⁴R⁵, where R⁴ and R⁵ is same or different and any of H, Me, Et, n-Pr, n-Bu, —CH₂CH₂OH.

8. The colorant of claim 1, wherein the ink formulation is a black fluorescent ink formulation for postal applications.

9. The colorant of claim 8, comprising a phosphor meter reading of about 46.

10. The colorant of claim 9, wherein the ink formulation has a viscosity of about 3 cps.

11. The colorant of claim 10, wherein the ink formulation has a surface tension of about 38.8 dynes/cm.

12. The colorant of claim 1, wherein the acid is selected from group consisting of: formic, acetic, glycolic, lactic, levulinic, gluconic, glucuronic, trifluroacetic, nitric, hydrochloric, phosphoric, sulphuric acids, and combinations thereof.

13. A colorant in an ink jet ink formulation, the colorant comprising an organic dye chromophore with at least one functional group Y containing one or more primary, secondary or tertiary amino groups, attached by a linking group X, which in the presence of an acid provides a water soluble, cationic ink jet ink colorant with increased water fastness when applied to paper, wherein the colorant includes a water-insoluble amino-substituted dye of formula (I): [Chromophore]-[X-Y]$_n$, where n=1–4 side chains of [X-Y], in the colorant.

14. The colorant of claim 1, wherein the ink jet ink formulation is a fluorescent ink jet ink formulation.

15. The colorant of claim 13, wherein X is selected from the group consisting of: —SO₂—; —CO—; —NR¹(CH₂)$_m$—, where R¹ is H, Me, Et, n-Pr, n-Bu, —CH₂CH₂OH, and —(CH₂)$_m$Y, and m=2 or 3; —CH₂; and

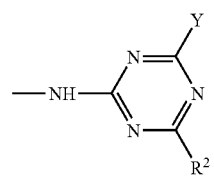

where R² is —OH, —OMe, —OEt, —Cl, —NH₂, —NHMe, —NHEt, —NMe₂—NEt₂, —NHCH₂CH₂OH, —NHPh, —N(CH₂CH₂OH)₂ or Y.

16. The colorant of claim 15, wherein Y is selected from the group consisting of:

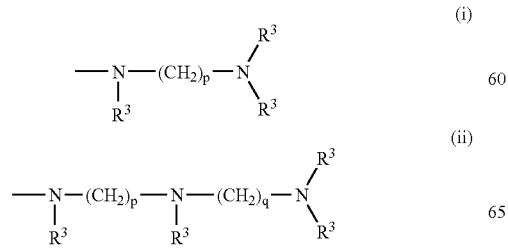

-continued

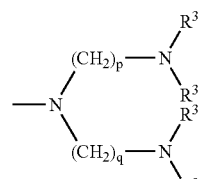

where R³ is, same or different, H, methyl, ethyl or —CH₂CH₂OH and p and q are 2, 3 or 4; and in the case of X=—CH₂, Y is selected from the group consisting of (i)–(iv) and:

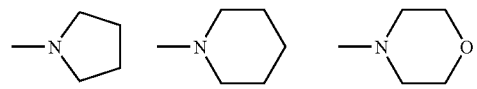

—NR⁴R⁵, where R⁴ and R⁵ is same or different and any of H, Me, Et, n-Pr, n-Bu, —CH₂CH₂OH.

17. The colorant of claim 16, wherein the ink formulation is a black fluorescent ink formulation for postal applications.

18. A colorant in an ink jet ink formulation, the colorant comprising an organic dye chromophore having at least two positive charges provided by one or more attached functional groups, Q, each containing one or more cationic quaternary ammonium groups, which provide a water soluble, cationic ink jet ink colorant, having increased water fastness when applied to paper.

19. The colorant of claim 18, further comprising a linking group, P, between the organic chromophore and the quaternary ammonium bearing functional group, Q.

20. The colorant of claim 19, comprising between 1 to 4 side chains of the functional group, Q.

21. The colorant of claim 18, wherein the organic dye chromophore is selected from the group consisting of azo, bisazo, hydrazone, anthraquinone, styryl, methine, triphenylmethane, xanthene, including rhodamines, zinc phthalocyanine, copper phthalocyanine, benzopyranobenzimidazopyridine derivative, oxazinium, phenothiazinium, phthalocyanine, porphyrin, coumarin, napthalimide, perylene, squaraine, cyanine, azacarbocyanine, hemicyanine, diethylaminepropyamine, methylpiperazine, and diazahemicyanine chromophores.

22. The colorant of claim 20, wherein Q is selected from the group consisting of:

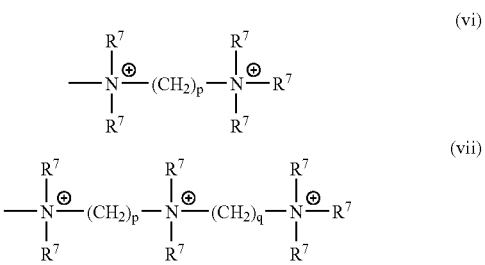

-continued

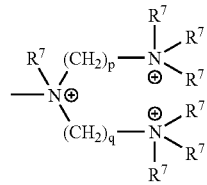 (viii)

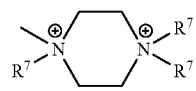 (ix)

where $R^7$ is any of the same or different of Me, Et, n-Pr, n-Bu or —(CH$_2$CH$_2$)H, and p and q are 2, 3 or 4; and where P is —CH$_2$ or —NR$^6$(CH$_2$)$_m$—, with R$^6$ as defined above and m=2 or 3, additional structures for Q include (x)–(xii):

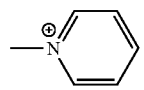 (x)

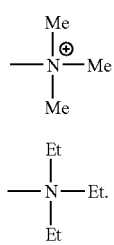 (xi)

(xii)

23. The colorant of claim 22, wherein the linking group, P, is selected from the group consisting of —SO$_2$—; —CO—; —CH$_2$—; and —NR$^6$(CH$_2$)$_m$—, where R$^6$ is H, Me, Et, n-Pr, n-Bu, —CH$_2$CH$_2$OH, or —(CH$_2$)$_m$Q and m is 2 or 3.

24. The colorant of claim 18, wherein the ink jet ink formulation is a fluorescent ink formulation.

25. A colorant in an ink jet ink formulation, the colorant comprising an organic dye chromophore having at least two positive charges provided by one or more attached functional groups, Q, each containing one or more cationic quaternary ammonium groups, which provide a water soluble, cationic ink jet ink colorant, having increased water fastness when applied to paper, wherein a linking group, P, is located between the organic chromophore and the functional group, Q, and the colorant is represented by formula (II): [Chromophore]-[P-Q]$_n$ where n=1–4 side chains of [P-Q], in the colorant.

26. The colorant of claim 25, wherein P is selected from the group consisting of —SO$_2$—; —CO—; —CH$_2$—; and —NR$^6$(CH$_2$)$_m$—, where R$^6$ is H, Me, Et, n-Pr, n-Bu, —CH$_2$CH$_2$OH, or —(CH$_2$)$_m$Q and m is 2 or 3.

27. The colorant of claim 26, wherein Q is selected from the group consisting of:

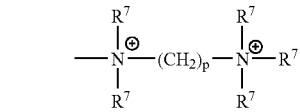 (vi)

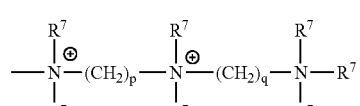 (vii)

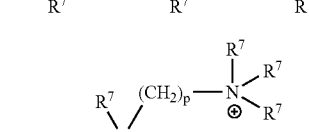 (viii)

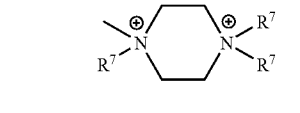 (ix)

where $R^7$ is any of the same or different of Me, Et, n-Pr, n-Bu or —(CH$_2$CH$_2$)H, and p and q are 2, 3 or 4; and where P is —CH$_2$ or —NR$^6$(CH$_2$)$_m$—, with R$^6$ as defined above and m=2 or 3, additional structures for Q include (x)–(xii):

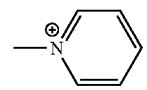 (x)

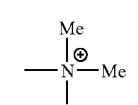 (xi)

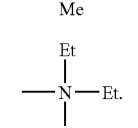 (xii)

28. The colorant of claim 18, wherein Q comprises at least two cationic quaternary functional groups.

29. The colorant of claim 25, wherein Q comprises at least two cationic quaternary functional groups.

30. A fluorescent ink jet printing ink formulation comprising the colorant of claim 7, water and an organic solvent mixed together to form the fluorescent ink jet printing ink formulation.

31. A fluorescent ink jet printing ink formulation comprising the colorant of claim 22, water and an organic solvent mixed together to form the fluorescent ink jet printing ink formulation.

32. A homogeneous aqueous ink formulation comprising:
  a) a first colorant comprising at least one fluorescent dye;
  b) a second colorant comprising the colorant of claim 7; and
  c) an aqueous liquid vehicle comprising water and an organic solvent;

wherein the ink formulation has an ink viscosity and surface tension effective for application of the ink to a cellulose substrate in a predetermined pattern by ink jet printing.

33. The homogeneous aqueous ink formulation of claim 32, wherein the ink is a black fluorescent ink for postal applications.

34. A homogeneous aqueous ink formulation comprising:
a) a first colorant comprising at least one fluorescent dye;
b) a second colorant comprising the colorant of claim 22; and
c) an aqueous liquid vehicle comprising water and an organic solvent;
wherein the ink formulation has an ink viscosity and surface tension effective for application of the ink to a cellulose substrate in a predetermined pattern by ink jet printing.

35. The homogeneous ink formulation of claim 34, wherein the ink is a black fluorescent ink for postal applications.

36. A homogeneous aqueous black fluorescent ink formulation comprising:
a) a first colorant comprising at least one fluorescent dye;
b) a second colorant comprising the colorant of claim 1; and
c) an aqueous liquid vehicle comprising water and an organic solvent;
wherein the homogeneous aqueous black fluorescent ink formulation has an ink viscosity and surface tension effective for application of the ink to a cellulose substrate in a predetermined pattern by ink jet printing.

37. A homogeneous aqueous black fluorescent ink formulation comprising:
a) a first colorant comprising at least one fluorescent dye;
b) a second colorant comprising the colorant of claim 18; and
c) an aqueous liquid vehicle comprising water and an organic solvent;
wherein the homogeneous black fluorescent ink formulation has an ink viscosity and surface tension effective for application of the ink to a cellulose substrate in a predetermined pattern by ink jet printing.

38. The colorant of claim 4 comprising a compound selected from the group consisting of (1)–(5):

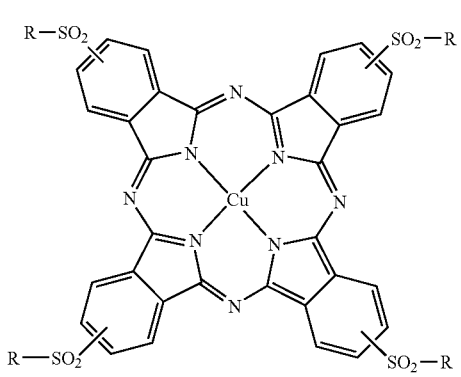

(1)

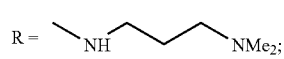

(1a)

-continued

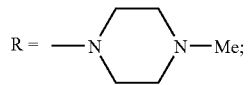

(1b)

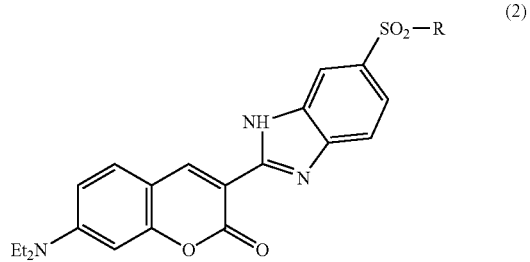

(2)

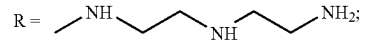

(2a)

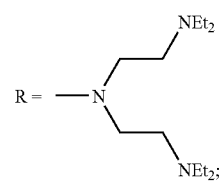

(2b)

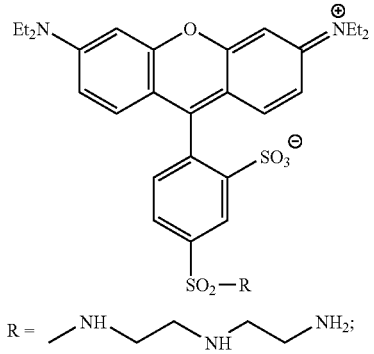

(3)

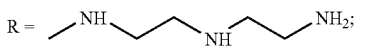

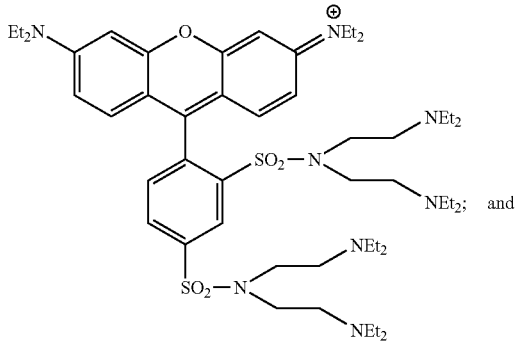

(4)

(5)
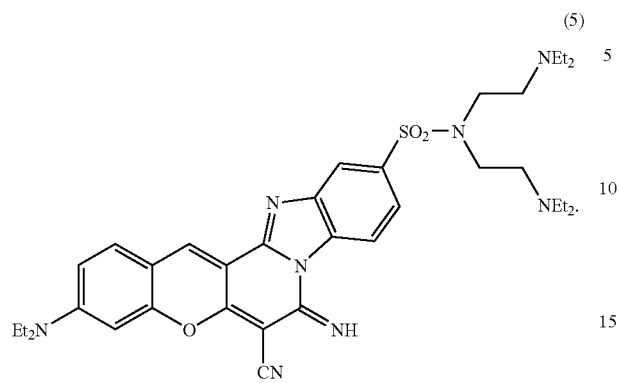
39. The colorant of claim 21 comprising a compound selected from the group consisting of (6)–(10):
(6)
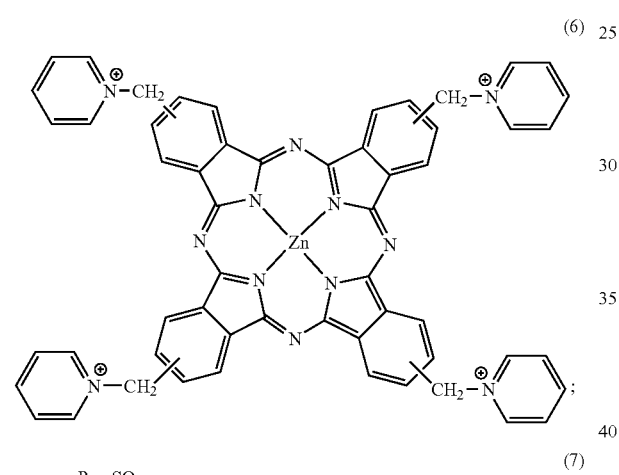
(7)
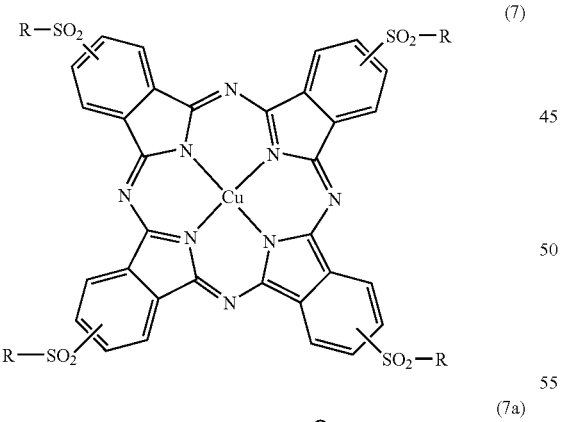
(7a)
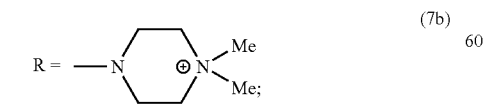
R = —NH—CH₂CH₂CH₂—N⁺Me₃;
(7b)
R = —N(piperazine)N⁺Me₂Me;
(8)
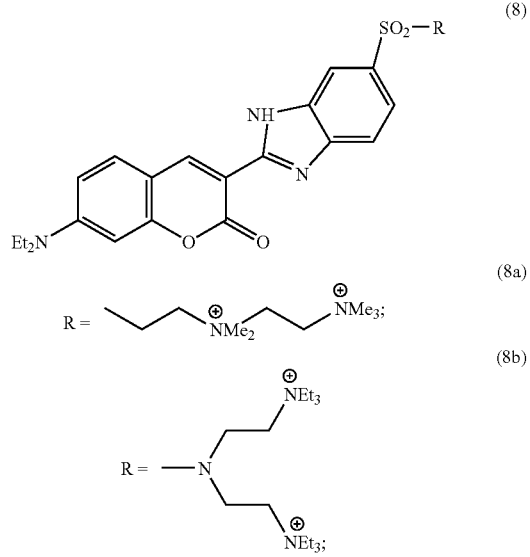
(8a)
R = —CH₂CH₂CH₂—N⁺Me₂—CH₂CH₂—N⁺Me₃;
(8b)
R = —N(CH₂CH₂N⁺Et₃)₂;
(9)
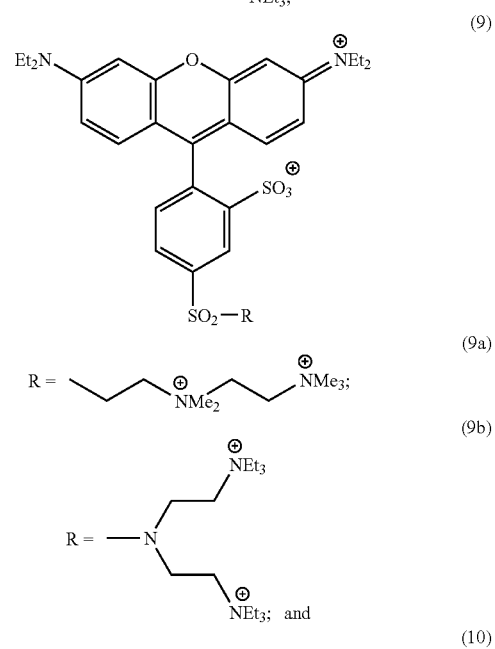
(9a)
R = —CH₂CH₂CH₂—N⁺Me₂—CH₂CH₂—N⁺Me₃;
(9b)
R = —N(CH₂CH₂N⁺Et₃)₂; and
(10)
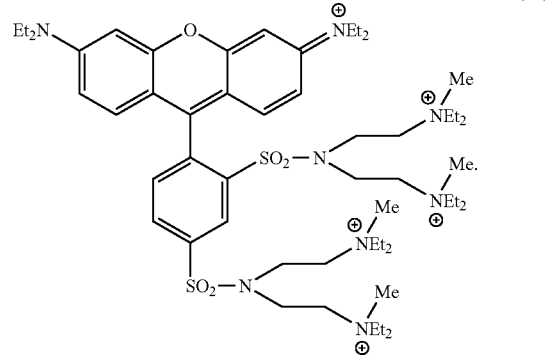
* * * * *